United States Patent [19]

Koch et al.

[11] Patent Number: 5,699,884
[45] Date of Patent: Dec. 23, 1997

[54] AUTOMATIC PLAY COMPENSATION IN CABLE OPERATED BRAKES ESPECIALLY OF MOTOR VEHICLES

[75] Inventors: Norbert Koch, Esslingen; Kurt Böhm, Denkendorf; Nikolaus Schefcsik, Schwaikheim; Jürgen Eipper, Kernen, all of Germany

[73] Assignee: Mercedes-Benz AG, Stuttgart, Germany

[21] Appl. No.: 708,458

[22] Filed: Sep. 5, 1996

[30] Foreign Application Priority Data

Sep. 16, 1995 [DE] Germany ............ 195 34 438.3

[51] Int. Cl.$^6$ ........................................ B60T 11/04
[52] U.S. Cl. ............... 188/196 B; 188/2 D; 188/196 R; 74/501.5 R
[58] Field of Search ............... 188/2 D, 196 B, 188/196 R, 196 P, 265, 67, 205 R; 74/523, 502.5, 502.6, 502.4, 516, 528, 535, 501.5 R; 192/111 A

[56] References Cited

U.S. PATENT DOCUMENTS

| | | |
|---|---|---|
| 4,379,500 | 4/1983 | Kamino ............... 188/196 B |
| 4,819,501 | 4/1989 | Kraus et al. ............... 74/523 |
| 4,854,187 | 8/1989 | Walters ............... 74/535 |
| 5,609,066 | 3/1997 | Bunker et al. ............... 74/523 |

FOREIGN PATENT DOCUMENTS 38 20 978  12/1989  Germany.

*Primary Examiner*—Douglas C. Butler
*Attorney, Agent, or Firm*—K. Bach

[57] ABSTRACT

In an automatic play compensation arrangement for a cable-operated parking brake including a brake operating element and a cable extending between the brake operating element and a vehicle brake for actuating the vehicle brake, a support bracket is mounted for movement with the brake operating element and has a spring-loaded clamping lever supported therein through which a cable end extends and by which the cable end is firmly engaged with the support bracket when the brake operating element is actuated, and a spring is provided for tensioning the cable when the brake operating element is in a brake-releasing rest position.

8 Claims, 3 Drawing Sheets

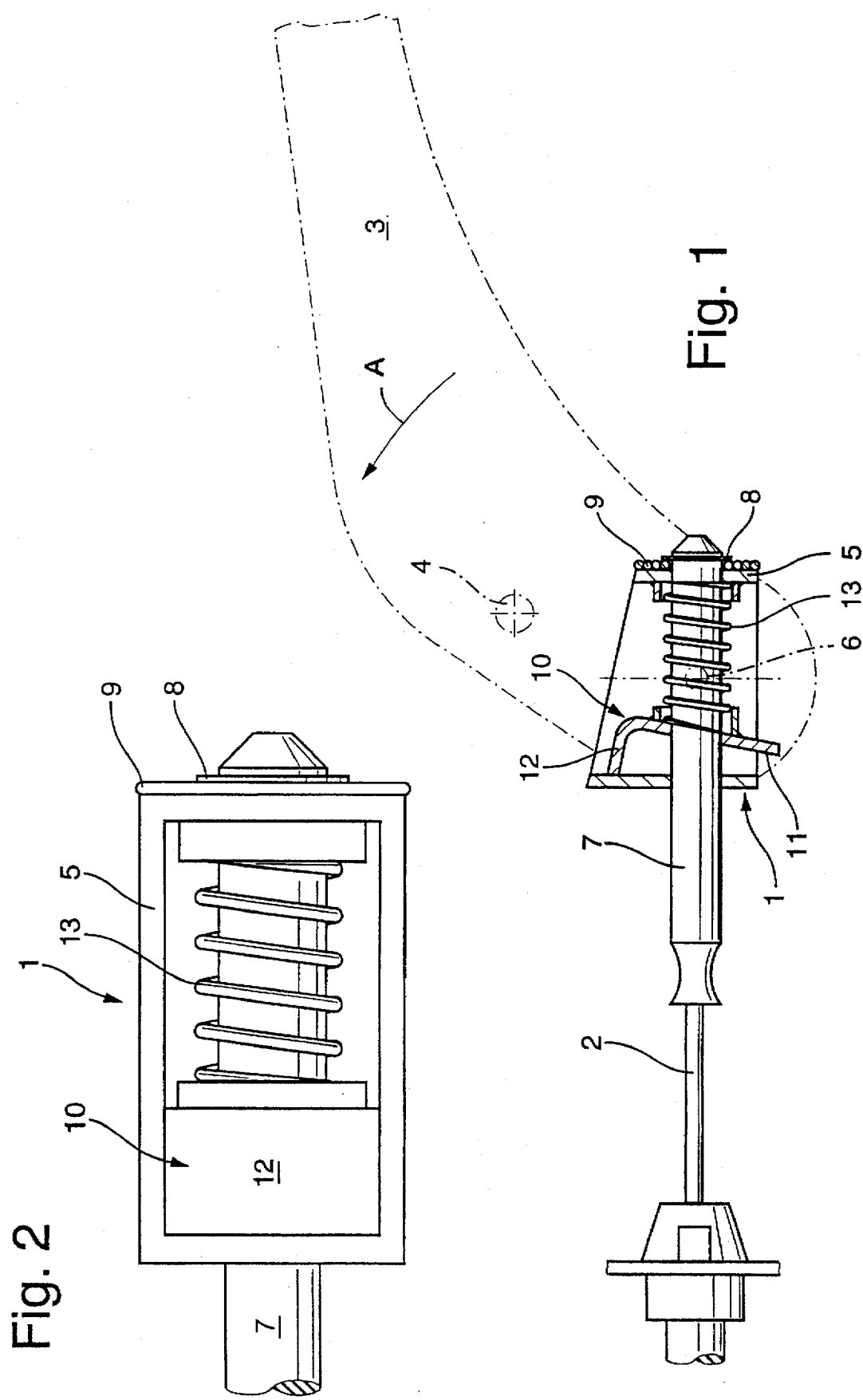

AUTOMATIC PLAY COMPENSATION IN CABLE OPERATED BRAKES ESPECIALLY OF MOTOR VEHICLES

BACKGROUND OF THE INVENTION

The invention relates to an automatic play compensation arrangement for cable operated parking brakes, particularly of motor vehicles, including a tensioning element arranged between an operating device and the operating cable.

It is the object of the present invention to provide such an automatic play compensation arrangement which is simple in design and has a high functional reliability.

SUMMARY OF THE INVENTION

In an automatic play compensation arrangement for a cable-operated parking brake including a brake operating element and a cable extending between the brake operating element and a vehicle brake for actuating the vehicle brake, a support bracket is mounted for movement with the brake operating element and a spring-loaded clamping lever is supported in the support bracket so as to firmly engage the cable with the support bracket when the brake operating element is actuated, and spring means are provided for tensioning the cable when the brake operating element is in a brake-releasing rest position.

In the arrangement according to the invention, the cable end in the clamping element is engaged by means of a stationary clamping lever in such a way that it is firmly held thereby when the brakes are activated but that it is slidably engaged by the clamping lever when the brakes are not activated while a spring holds the cable under slight tension.

In this manner, automatic cable tensioning is achieved.

The invention will become more readily apparent from the following description of a preferred embodiment described below on the basis of the accompanying drawings.

BRIEF DESCRIPTION OF THE DRAWINGS

FIG. 1 is a cross-sectional view of the engagement mechanism for a self-adjusting parking brake operating mechanism wherein a hand operated element is indicated by dash dotted lines, FIG. 2 is a top view of the mechanism.

DESCRIPTION OF PREFERRED EMBODIMENT

Figure 3:
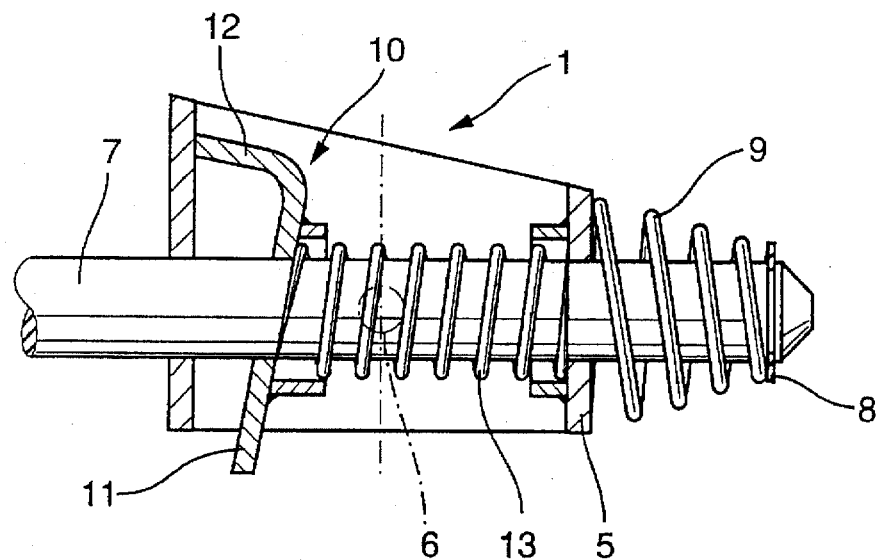
FIG. 3 is a cross-sectional view of the cable play adjustment mechanism in an adjustment end position.

As shown in FIG. 1, the engagement mechanism 1 interconnects the end of an operating cable 2 and a brake operating element 3.

The brake operating element 3 is a hand-operated lever which is supported so as to be rotatable about an axis 4. For operating the parking brake, the operating element 3 is pivoted in the direction of the arrow A.

At its shorter end that is at its end closer to the axis 4, the operating lever 3 has a support bracket 5 rotatably mounted thereon. The support bracket 5 forms a bearing structure for the engagement mechanism 1 at the end of the cable 2. The axis along which the support bracket 5 is rotatably supported on the short end of the operating lever 3 is marked in FIG. 1 by dash-dotted lines and is indicated by the numeral 6.

The end of the operating cable 2 is formed as a clamping rod 7 which is slidably supported in openings in the support bracket 5. At the end of the clamping rod 7 which extends through the support bracket 5, the clamping rod carries a circlip 8 which forms a stop. Between this stop 8 and the support bracket S, there is a compression spring 9. In order to provide for the shortest possible length of this compression spring 9 the compression spring 9 is a conical spring wherein all the turns are disposed in one plane when it is in a fully compressed state as shown in FIG. 1.

When the brake is released, that is, when the brake operating lever 3 is in its rest position in a direction opposite to that indicated by the arrow A, the compression spring 9 holds the cable 2 under tension by way of the clamping rod 7.

A clamping lever 10 disposed within the support bracket 5 firmly engages the clamping rod 7 when the parking brake is operated by pivoting the brake operating lever 3 in the direction of the arrow A. The clamping rod 7 then remains in the position in which the clamping rod 7 was held by the compression spring 9 while the lever 3 was in its rest position. This effect is achieved by the clamping lever 10 because it tilts while it abuts the support bracket 5 and thereby firmly engages the clamping rod 7 in an opening through which the clamping rod extends.

The clamping lever 10 is held in position only by the clamping rod 7 extending therethrough. Abutment on the support bracket 5 only provides for the angled clamping lever the moment necessary for the desired engagement with the clamping rod 7.

Figure 6:
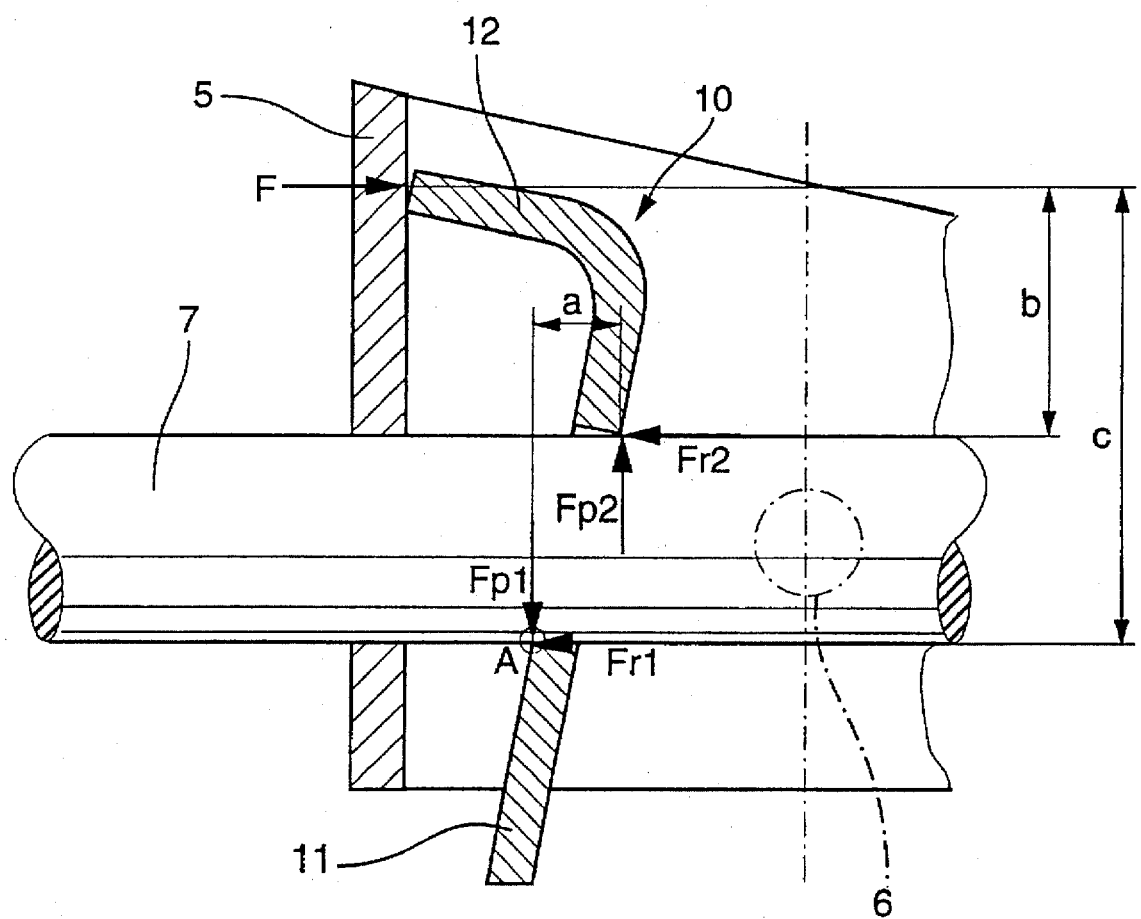
FIG. 6 shows the generation of the physical clamping forces of the clamping lever on the basis of a force diagram.

The generation of the physical clamping forces of the clamping lever 10 is explained with respect to FIG. 6 on the basis of a force diagram.

F is the force to be transmitted by the operating cable 2 when the brake is engaged. The force F applied by the support bracket 5 to the clamping lever 10 generates, at the opposite engagement areas of the clamping lever 10 with the clamping rod 7, the reaction forces $Fr_1$ and $Fr_2$ which, as shown, are each ½ F, but which act on the clamping rod at locations spaced axially by a distance a. The clamping lever has a lever arm 11 and a lever arm 12 on which the force F acts with an effective distance b from one of the engagement points with the clamping rod and an effective distance c from the other of the engagement points with the clamping rod providing a moment generating the engagement forces $Fp_1$ and $Fp_2$.

The forces as shown in FIG. 6 and the moment about the point A result, under equilibrium considerations, in the following equations:

$$\Sigma Fx=0, \text{ consequently } F=Fr_1+Fr_2 \quad (1)$$

$$\Sigma Fy=0, \text{ consequently } Fp_1=Fp_2 \ (=Fp) \quad (2)$$

$$\Sigma M_A=0, \text{ consequently } Fp=Fx \ (b+c)/(2\times a) \quad (3)$$

From Coulomb's law of friction:

$$Fr=Fp \times \mu .$$

With the above condition a state of self-locking between the clamping rod 7 and the clamping lever 10 is present if:

$\mu > a/(b+c)$.

If the interacting materials, that is, the clamping rod 7 and the clamping lever 10 consist both for example of steel, the friction coefficient with lubricated surfaces is $\mu = 0.1$.

In the present case, self-locking is achieved with $a = 2.5$ mm, $b = 10$ mm and $c = 18$ mm already for $\mu = a/(b+c) = 2.5/(10 + 18) = 0.089$.

Accordingly, with lubricated steel surfaces which have a friction coefficient of $\mu = 0.1$ self-locking would be safely achieved.

In order to insure that the clamping lever 10 always abuts the support bracket 5 and is ready for firm engagement with the clamping rod 7 when the parking brake is activated a retaining spring 13 is provided which holds the clamping lever 10 in proper position also when the brake is deactivated. The force of the retaining spring 13, however, is substantially smaller than that of the compression spring 9. The compression spring 9 is therefore able to tighten the operating cable 2, via the clamping rod 7, when the brake is deactivated whereby the clamping rod 7 is pulled through the opening in the clamping lever 10. When the clamping rod 7 is pulled through the clamping lever 10 the clamping lever is momentarily disengaged from the clamping rod 7 against the force of the retaining spring 13. After adjustment of the cable play, that is, after the slack in the cable has been compensated for, the clamping lever 10, under the force of the retaining spring 13, again assumes its clamping position which it must maintain when the brake is activated.

The clamping rod 7 is preferably a square rod so that it has a relatively large clamping engagement surface. To increase in the engagement between the clamping rod and the clamping lever the surfaces of the clamping rod may have a certain profile, for example a saw tooth profile.

Figure 4:
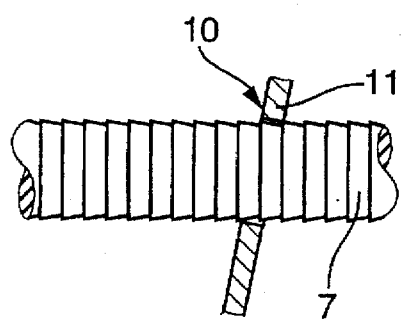
FIG. 4 is a partial view showing a profiled cable end engaged by a clamping lever.

A circular clamping rod with such a saw tooth profile is shown in FIG. 4.

Figure 5:
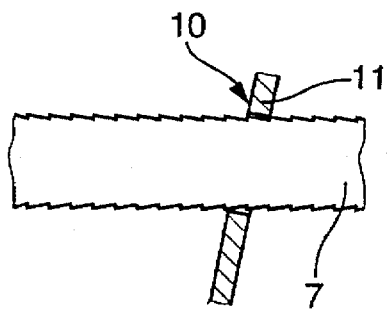
FIG. 5 is a partial view showing another embodiment of a profiled cable end engaged by a clamping lever.

FIG. 5 shows a clamping rod with a sawtooth profile formed from a square rod. As shown, the teeth project at the opposite surfaces in opposite directions.

What is claimed is:

1. An automatic play compensation arrangement for cable-operated vehicle parking brakes, including a brake operating element and a cable extending between said brake operating element and a vehicle brake for actuating said vehicle brake, said arrangement comprising a support bracket mounted for movement with said brake operating element, a spring-loaded clamping lever supported in said support bracket, said cable having an end extending through said support bracket and being slidably supported therein and said cable end also extending through said clamping lever and being firmly engaged by said clamping lever when said brake operating element is actuated and spring means for tensioning said cable when said brake operating element is in a brake releasing rest position.

2. An automatic play compensation arrangement according to claim 1, wherein said cable end extending through said clamping lever has the form of a clamping rod.

3. An automatic play compensation arrangement according to claim 2, herein said clamping rod is a square rod.

4. An automatic play compensation arrangement according to claim 3, wherein said clamping rod has opposite clamping surfaces with a sawtooth profile for locking engagement with said clamping lever when said brake operating element is actuated.

5. An automatic play compensation arrangement according to claim 2, wherein said clamping rod has surfaces for engagement with said clamping lever with a surface profile by which said rod is locked with said clamping lever when said brake operating element is actuated.

6. An automatic play compensation arrangement according to claim 5, wherein said surface profile is a sawtooth profile.

7. An automatic play compensation arrangement according to claim 2, wherein said clamping lever is an L-shaped member with a first leg having an opening through which said clamping rod extends so as to be freely movable when said first leg extends essentially normal to the axis of said clamping rod, but engaging said clamping rod when said first leg is being slanted, said L-shaped member having a second leg which projects toward a support wall of said bracket for engagement therewith when said brake element is actuated whereby said first leg is forced into a slanted position in which it firmly engages said clamping rod.

8. An automatic play compensation arrangement according to claim 2, wherein said brake operating element is a pivotally supported operating lever and said support bracket is rotatably mounted on said operating lever.

\* \* \* \* \*